United States Patent
Bhattacharjee et al.

(10) Patent No.: US 10,489,461 B2
(45) Date of Patent: Nov. 26, 2019

(54) MULTIDIMENSIONAL SPATIAL SEARCHING FOR IDENTIFYING SUBSTANTIALLY SIMILAR DATA FIELDS

(71) Applicant: Oracle International Corporation, Redwood Shores, CA (US)

(72) Inventors: Abhijit Bhattacharjee, Bangalore (IN); Pradeep Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 456 days.

(21) Appl. No.: 15/446,670

(22) Filed: Mar. 1, 2017

(65) Prior Publication Data
US 2017/0177743 A1    Jun. 22, 2017

Related U.S. Application Data

(63) Continuation of application No. 14/464,556, filed on Aug. 20, 2014, now Pat. No. 9,589,074.

(51) Int. Cl.
*G06F 16/903*    (2019.01)
*G06F 11/07*    (2006.01)
(Continued)

(52) U.S. Cl.
CPC .... *G06F 16/90344* (2019.01); *G06F 11/0706* (2013.01); *G06F 11/0778* (2013.01);
(Continued)

(58) Field of Classification Search
CPC ............ G06F 16/90344; G06F 16/284; G06F 16/367; G06K 9/00872
See application file for complete search history.

(56) References Cited

U.S. PATENT DOCUMENTS 5,757,959 A * 5/1998 Lopresti ............ G06K 9/00872
382/186
6,738,928 B1    5/2004 Brown
(Continued)

FOREIGN PATENT DOCUMENTS

CA    2710882    7/2009
CN    101719090 A    6/2002
(Continued)

OTHER PUBLICATIONS

Kurtz, "Approximate String Searching under Weighted Edit Distance", In Proceedings of Third American Workshop on String Processing, Recife, Brazil, Aug. 1996, Carlton University Press.
(Continued)

*Primary Examiner* — Etienne P Leroux
(74) *Attorney, Agent, or Firm* — Kilpatrick Townsend & Stockton, LLP

(57) ABSTRACT

A method of identifying substantially similar data fields may include accessing a first/second text strings, performing an approximate string-matching algorithm that generates a first score, and comparing the first score to a first threshold. The method also includes performing an exact string-matching algorithm that generates a second score and comparing the second score to a second threshold. The method further includes generating a third score by combining a weighted first score with a weighted second score and comparing the third score to a third threshold. The method also includes determining whether the first text string is substantially similar to the second text string based on the three score comparisons.

20 Claims, 11 Drawing Sheets

(51) Int. Cl.
 *G06F 16/33* (2019.01)
 *G06F 16/9038* (2019.01)
 *G06F 16/9535* (2019.01)
 *G06F 11/14* (2006.01)

(52) U.S. Cl.
 CPC ........ *G06F 11/1453* (2013.01); *G06F 16/334* (2019.01); *G06F 16/9038* (2019.01); *G06F 16/9535* (2019.01); *G06F 2201/80* (2013.01)

(56) References Cited

U.S. PATENT DOCUMENTS

| | | | |
|---|---|---|---|
| 7,376,636 B1* | 5/2008 | Wang | G06F 16/284 |
| | | | 707/694 |
| 7,653,621 B2 | 1/2010 | Senthil | |
| 8,131,759 B2 | 3/2012 | Salcedo | |
| 8,495,075 B2 | 7/2013 | Miller | |
| 9,589,074 B2 | 3/2017 | Bhattacharjee et al. | |
| 2006/0041938 A1 | 2/2006 | Ali | |
| 2007/0074149 A1 | 3/2007 | Ognev et al. | |
| 2011/0106821 A1* | 5/2011 | Hassanzadeh | G06F 16/367 |
| | | | 707/749 |
| 2016/0055262 A1 | 2/2016 | Bhattacharjee et al. | |

FOREIGN PATENT DOCUMENTS

| | | |
|---|---|---|
| CN | 101702171 | 5/2010 |
| EP | 1095326 B1 | 1/2000 |
| WO | 2000003315 | 1/2000 |
| WO | 2008043582 A1 | 4/2008 |
| WO | 2013083369 A1 | 6/2013 |

OTHER PUBLICATIONS

Li et al., "Spatial Approximate String Search", IEEE Transactions on Knowledge and Data Engineering, vol. 25, No. 6, Jun. 2013, pp. 1394-1409.
U.S. Appl. No. 14/464,556, Non-Final Office Action dated Jun. 13, 2016, 16 pages.
U.S. Appl. No. 14/464,556, Notice of Allowance dated Oct. 24, 2016, 7 pages.

* cited by examiner

|   | | a | s | h | b | e | r | r | y |
|---|---|---|---|---|---|---|---|---|---|
|   | 0 | 1 | 2 | 3 | 4 | 5 | 6 | 7 | 8 |
| a | 1 | 0 | 1 | 2 | 3 | 4 | 5 | 6 | 7 |
| s | 2 | 1 | 0 | 1 | 2 | 3 | 4 | 5 | 6 |
| h | 3 | 2 | 1 | 0 | 1 | 2 | 3 | 4 | 5 |
| b | 4 | 3 | 2 | 1 | 0 | 1 | 2 | 3 | 4 |
| e | 5 | 4 | 3 | 2 | 1 | 0 | 1 | 2 | 3 |
| r | 6 | 5 | 4 | 3 | 2 | 1 | 0 | 1 | 2 |
| l | 7 | 6 | 5 | 4 | 3 | 2 | 1 | 2 | 3 |
| y | 8 | 7 | 6 | 5 | 4 | 3 | 2 | 3 | 2 |

FIG. 5

```
def diff(C, X, Y, i, j, result ):
    if i > 0 and j > 0 and lev_ratio(X[i-1] , Y[j-1])[0] >= threshold:
        diff(C, X, Y, i-1, j-1, result )
        result += [(X[i-1], Y[j-1], fuzzy_ratio(X[i-1] , Y[j-1]))]
    else:
        if j > 0 and (i == 0 or C[i][j-1] >= C[i-1][j]):
            diff(C, X, Y, i, j-1, result )
            result += [('', Y[j-1], (0, len(Y[j-1]), len(Y[j-1])))]
        elsif i > 0 and (j == 0 or C[i][j-1] < C[i-1][j]):
            diff(C, X, Y, i-1, j, result )
            result += [(X[i-1], '', (0, len(X[j-1]), len(X[j-1])))]

def diff_score(old, new):
    result = []
    diff(LCS(old, new), old, new, len(old), len(new), result)
    max_word_len = max(map(len, old))
    for a,b,r in result:
        fmt = "{{:{}}}{}}".format('^',max_word_len)*2 + "{:^5}|"*3
        print "|" + fmt.format(a,b,*r)
    match = [r[-1][1:] for r in result if r[-1]]
    match, population = map(sum, zip(*match))
    return (round(1 - 1.*match/population, 2), match, population)
```

FIG. 8

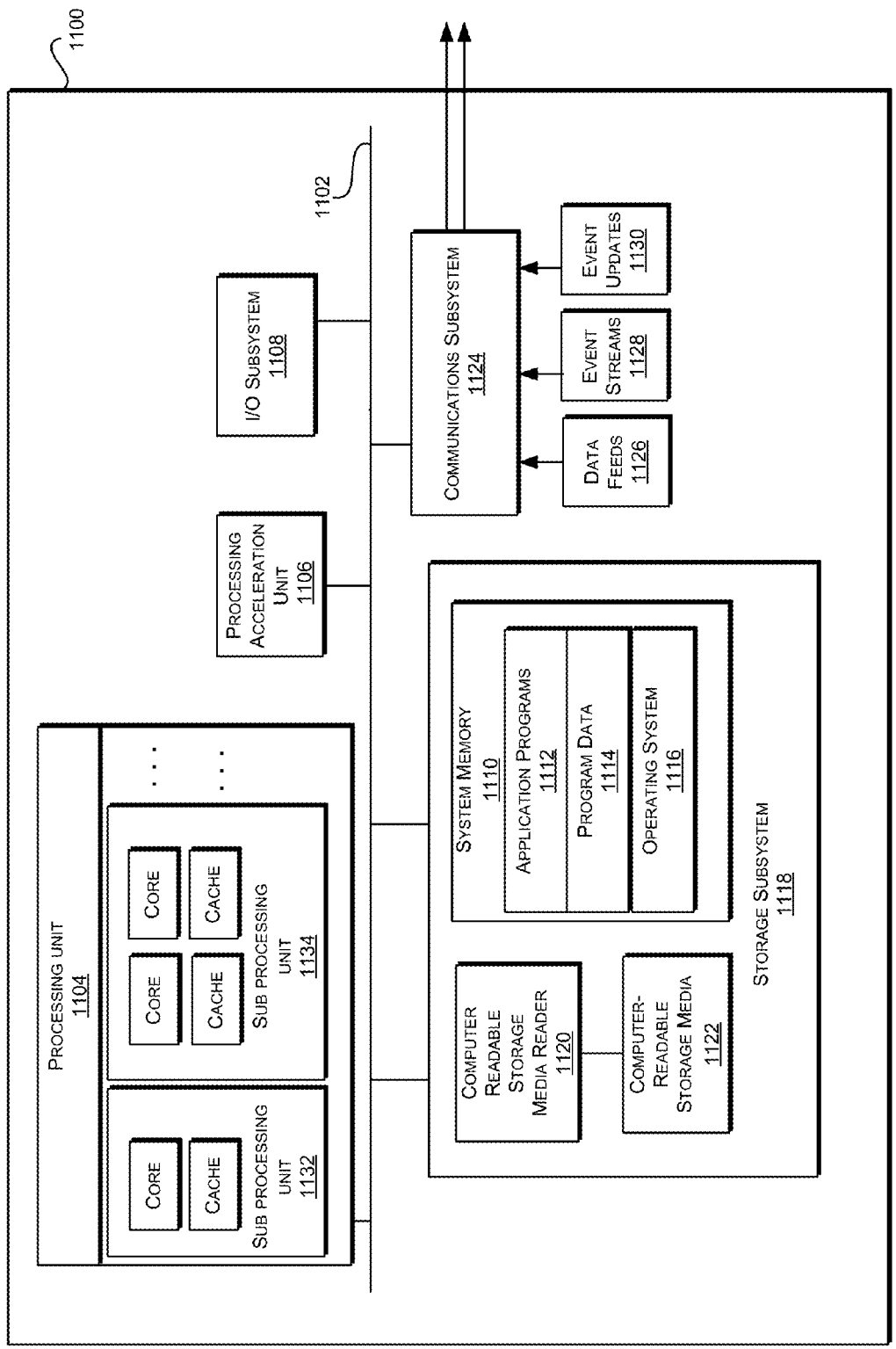

US 10,489,461 B2

MULTIDIMENSIONAL SPATIAL SEARCHING FOR IDENTIFYING SUBSTANTIALLY SIMILAR DATA FIELDS

CROSS-REFERENCES TO RELATED APPLICATIONS

This application is a continuation of U.S. application Ser. No. 14/464,556 filed on Aug. 20, 2014, which is incorporated herein by reference.

BACKGROUND

In computing, a core dump, memory dump, or crash dump consists of the recorded state of the working memory of a computer program when the program has terminated abnormally or crashed. In the crash dump, key pieces of the program state can be saved, including process registers, program counters, stack pointers, memory management information, a function call stack, and/or the like. The crash dump can then be used to diagnose or debug errors in computer programs.

BRIEF SUMMARY

In some embodiments, a method of identifying duplicate crash dumps in a computer system may be presented. The method may include receiving a first crash dump caused by an application crash, extracting a first function signature of a function that caused the first crash dump, and searching a datastore of crash dumps for function signatures that substantially match the first function signature. The searching may include performing an approximate string-match between each of the function signatures the first function signature and performing an exact string match between each of the function signatures and the first function signature. The searching may also include combining weighted results of the approximate string-match with weighted results of the exact string match to generate match scores for each of the function signatures, and identifying the function signatures that substantially match the first function signature based on the match scores.

In other embodiments, a non-transitory computer-readable medium may be presented. The computer-readable memory may comprise a sequence of instructions which, when executed by one or more processors, causes the one or more processors to perform operations comprising receiving a first crash dump caused by an application crash, extracting a first function signature of a function that caused the first crash dump, and searching a datastore of crash dumps for function signatures that substantially match the first function signature. The searching may include performing an approximate string-match between each of the function signatures the first function signature and performing an exact string match between each of the function signatures and the first function signature. The searching may also include combining weighted results of the approximate string-match with weighted results of the exact string match to generate match scores for each of the function signatures, and identifying the function signatures that substantially match the first function signature based on the match scores.

In other embodiments, a system for identifying duplicate crash dumps may be presented. The system may include a crash dump data store. The crash dump data store may include a plurality of crash dumps, and the plurality of crash dumps may include function signatures. The system may also include a computer system running an application. When the application crashes, a first crash dump may be triggered. The system may additionally include a function matching module operating on a server that is in communication with the computer system. The function matching module may receive the first crash dump from the computer system. The function matching module may extract, from the first crash dump, a first function signature of a function that caused the first crash dump. The function matching module may search the plurality of crash dumps from the crash dump data store for function signatures that substantially match the first function signature. The searching may be carried out by performing an approximate string-match between each of the function signatures the first function signature, performing an exact string match between each of the function signatures and the first function signature, combining weighted results of the approximate string-match with weighted results of the exact string match to generate matching scores for each of the function signatures, and identifying the function signatures that substantially match the first function signature based on the match scores.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates a matrix populated to determine an approximate string match, according to one embodiment.

FIG. 8 illustrates pseudocode for implementing a multidimensional spatial text matchuing algorithm, according to one embodiment.

FIG. 11 illustrates an exemplary computer system, in which various embodiments may be implemented.

DETAILED DESCRIPTION

Figure 1:
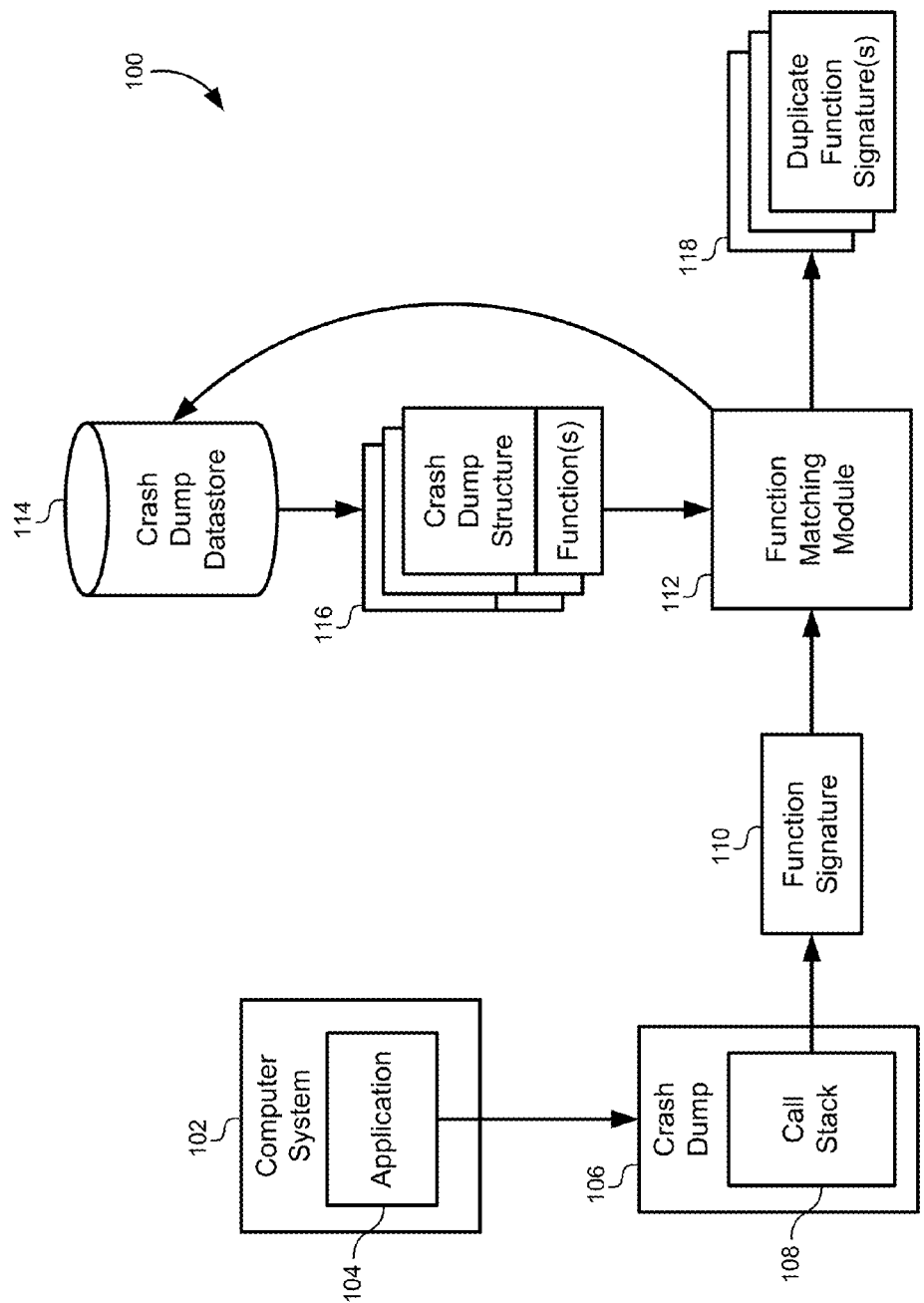
FIG. 1 illustrates a block diagram of a system for identifying duplicate crash dumps, according to one embodiment.

Described herein, are embodiments of methods and systems for a multidimensional, "fuzzy" spatial text matching process that uses a combination of approximate string matching techniques and exact string matching techniques to compare text signatures to determining whether they are substantially similar. The extent to which two signatures match can provide a score of the closest matching signature from a pool of data blocks within a search space. These techniques allow for a multidimensional spatial text search even though there may be mismatches due to differences in formatting, noise, or other acceptable differences between text blocks. Differences between two text blocks can be due to addition/deletion of sentences, addition/deletion of words within a sentence or addition/removal/change of characters within a word. This multidimensional spatial text matching is used by embodiments described herein to identify duplicate crash dumps by matching causal function signatures. As used herein, the term "fuzzy" refers to a combination of exact string matching and approximate string matching techniques.

In some embodiments, a fuzzy string comparison between two strings may be performed by combining a weighted Levenshtein distance score above a defined threshold and a weighted Longest Common Substring score above a defined threshold. The weighted Levenshtein distance score may be calculated as the ratio between the Levenshtein distance between two strings and the average length of both the strings. The Longest Common Substring score may be determined by calculating the ratio between the length of the Longest Common Substring and the average length of both the strings. If the weighted combined Levenshtein and Longest Common Substring score is above a defined threshold, the strings may be identified as similar.

A crash dump may include a pool of data blocks, i.e. a group of text blocks that can be individually selected, indexed, and/or accessed. In some embodiments, a crash dump can be stored as blocks of data in an SQL database where each tuple of the SQL table can contain a single block of texts. Similarly, the data blocks can also be presented in a document-oriented database where individual sentences in a block of text are stored as a field, and individual text blocks are stored as a document inside a collection, which can also be thought of as a pool of data blocks. The search techniques described herein can be used to search a crash dump for function signatures that match a selected function signature. When a crash dump occurs, a culprit function that is believed to have caused the failure can be identified in the crash dump. In order to diagnose the root cause of the application failure, it may be beneficial to analyze other crash dumps caused by the same function. The embodiments described herein may store a library of previous crash dumps for future analysis. These previous crash dumps may be searched to find function signatures that match the function signature causing the current crash dump. Because function signatures of the same function may have different arguments, different storage formats, and may change slightly over time as software is upgraded, simple text matching is inadequate to match a current function signature with similar function signatures from past crash dumps.

Today, textual searching is linear. Two strings either match or they don't. By combining approximate string matching techniques with exact string matching techniques, it is possible to provide an acceptable match score between two blocks of texts where the differences might happen because of formatting changes, manual/automated editing, noise addition, or differences that eventually accumulated over time. This enables a search mechanism to search among candidates to select the best matching text block and calculate a match score.

The embodiments described herein provide systems and methods for providing a search mechanism to determine the best matching text block among candidates of possible candidates of text blocks. These search techniques can be used to find the best match for a function signature in a library of previous crash dumps. The embodiments used herein provide a searching and/or matching technique that combines approximate string matching with exact string matching. Merely by way of example, a particular approximate string matching technique is used herein to provide an enabling disclosure, namely calculating the Levenshtein difference, which is a string metric for measuring the difference between two sequences. However, other approximate string matching algorithms may also be used without limitation, such as locality-sensitive hashing, Needleman-Wunsch algorithms, Smith-Waterman algorithms, the Taro-Winkler distance, and/or the like. Similarly, a particular exact string matching technique is also used herein to provide an enabling disclosure, namely calculating the longest common substring, which identifies the largest string shared between two or more texts. However, other exact string matching algorithms may also be used without limitation, such as naive string search algorithms, Rabin-Karp string search algorithms, finite-state automation-based searches, Knuth-Morris-Pratt algorithms, Boyer-Moore string search algorithms, Bitap algorithms, and/or the like.

Each of these two techniques for string matching can generate a weighted score. The Levenshtein distance score can be calculated as the ratio between the Levenshtein distance and the average length of the string. The Longest Common Substring score can be calculated as the ratio between the longest common subsequence and the longest subsequence common to all sequences in a set of sequences. The "fuzzy" score can be calculated as the weighted sum of the Levenshtein distance score and Longest Common substring score.

Consider two blocks of texts, where each block is a sequence of words, or a sequence of sentences, and where each sentence is a sequence of words. Using exact string matching, such as the UNIX "diff" command, reports the differences between the two texts, which could be a single word or a sequence of words. In cases where the lines differ by a single character, the sentence would be reported as different. By combining the exact string matching with approximate string matching, it is possible to not only report the differences between the lines but to also report the extent of the difference and generate a final match score, which enables fuzzy searching/matching of text blocks.

As described above, an application for this method has been implemented for determining duplicate crash dumps. Through a series of computer implemented steps, the perpetrator function for a particular application crash can be identified. The function signature can then be used to search an existing crash dump repository which may be organized in a manner wherein the name of each perpetrator function is stored in the crash header alongside other relevant information from the call stack in a set of crash details. A call stack can be represented as a sequence of function signatures, each of which in turn is a sequence of characters. Fuzzy string matching using approximate string matching and exact string matching can be utilized to determine a match score for each of the reported crashes compared to the perpetrator function's signature. Each match score can be compared to a predetermined threshold to select possible match candidates. For each of the possible match candidates, call stacks can be compared to the call stack of the crash dump to determine the best possible candidate using Longest Common Substring of tokens using fuzzy token matching. The best candidate is determined by comparing the extent of call stack match and the fuzzy match score. The data can then be presented in a tabular form where the crash dump is correlated with a possible duplicate candidate alongside a match percentage. This data can then be utilized to determine a possible duplicate candidate if present.

FIG. 1 illustrates a block diagram 100 of a system for identifying duplicate crash dumps, according to one embodiment. Generally, an application 104 can be executed by a computer system 102. For a variety of reasons, the application 104 may occasionally fail. Crash dumps are generated whenever there is failure in the application 104 that causes it to be terminated abnormally by the operating system. When the failure of the application 104 occurs, the contents of all volatile memory are written to disk for later evaluation as a "crash dump." Along with other information, a crash dump contains a representation of the call stack, which a developer or a crash dump analyst may utilize to determine the cause of the crash. Crashes happen both at the customer location and during automated regression runs. Therefore, the computer system 102 may be remotely located from the rest of the computer systems and block diagram 100. When a crash happens in application 104 and a crash dump is generated, there is no known methodology of determining if there is already an existing reported crash dump that has already been acknowledged and for which a developer is currently working. Oftentimes, a patch has already been generated to fix the root cause in some future builds. By not recognizing duplicate crash dumps, extensive effort is wasted by both the crash dump analyst and the developer to manually analyze the same problem over and over. The problem is further exacerbated if the assigned developer is different from a previous developer who had worked on a similar crash. This involves a considerable waste of effort. Subsequently, turnaround time for an issue acknowledgement is higher, which would mean low process efficiency, which can affect the customer satisfaction for IT support systems.

The embodiments described herein and depicted in diagram 100 describe a system that works with an existing crash dump data store 114, which is assumed to have been updated after each previous crash dump. The crash dump data store 114 may be implemented using a database with table entries representing crash dumps, call stacks, and other data structures. Alternatively or additionally, the crash dump data store 114 may simply be an area of memory where crash dump files are saved. The crash dump data store 114 may also collect information regarding crash dumps from across multiple working environments. Note that function signatures in call stacks of different environments may vary considerably, which presents a unique challenge for finding matching function signatures. In some cases, the crash dump data store 114 may be updated manually without adopting any specific protocol while adding information such as a bug subject and a bug body. Note that this may result in crash dumps caused by the same function that vary greatly in their formats. There is no guarantee that traditional string search methods could correctly match any of the entries in the crash dump data store 114, even though similar crash dumps exist because of variations, data truncations, typographical errors, and/or the like.

When the application 104 crashes, it may produce a crash dump 106 as described above. The crash dump 106 will generally include a representation of the current call stack 108. Based on the call stack 108, a function signature 110 that is believed to cause the crash can be extracted. In some cases, the function signature at the top of the call stack may be identified as the cause of the crash. However, often the crashing function may not be the cause, and some extensive analysis may be required determine the function signature 110. This requires prior system knowledge, demarcating application and non-application function calls (operating system APIs, CRT functions), and a way to compare and match call stacks.

TABLE 1

7  <signal handler called>
8  0x00001e987d007845 in wcslen
9  0x00002b573c0056a2 in org_wcslen_16
10 0x00002b573c005be6 in org_wcsdup_16
11 0x00002b5743fe8fbf in CPVGDataPostProcessor::FormatRowset
12 0x00002b574400f94e in CQueryDataSource::runQueryDrillDown
13 0x00002b5744011a76 CQueryDataSource::executeDrillDown
14 0x00002b5744f93c39 in CEngineObjRef::ExecuteDrillDn By way of example, consider the call stack in Table 1. At first glance, this stack hints to the fact that wsclen is the function causing the crash. Oftentimes, the topmost function in the stack can be diagnosed as the cause of the crash. However, there are a few more scenarios that can be considered before diagnosing a cause. For example, wcslen may be part of the C/C++ standard library. This makes it unlikely that this function would be the cause because this would mean that the standard compiler library is buggy. Therefore, some embodiments can distinguish between application and non-application function calls, such as operating system APIs, CRT functions, and/or the like. The next two functions in the call stack, org_wcslen_16 and org_wc_sdup_16 may be also be viable candidates. However, someone having prior system knowledge, such as a developer, may know that these are well-tested, common string utility functions. Therefore, it is not likely that either of these functions caused the crash, as this could indicate a catastrophic problem over the entire application base. Therefore, some embodiments may exclude functions that have a documented testing history. By excluding non-application functions and robust functions, the system could conclude with a high probability that the perpetrator of this crash is FormatRowset by process of elimination.

Some embodiments can distinguish between an application and non-application functions by maintaining a list of all application APIs. This list of APIs can be generated by executing dumpbin on Windows systems (or nm for posix systems) on the application code and/or the shared object/dynamic link libraries. The generated list would be a reference for discarding any non-application function calls.

A function matching module 112 can be implemented on a server in order to receive a function signature 110 and find any duplicate crash dumps that exist in the crash dump data store 114. Generally, the function matching module 112 will be implemented at a central location in an Enterprise Software System, such that the function matching module 112 can receive function signatures from many different computer systems, such as computer system 102. The typical Enterprise Software System will include many different distributed computer systems operating in many different computing environments, so variations in the same function signatures may be a common occurrence. As will be described below in greater detail, the function matching module 112 can receive a plurality of crash dumps 116 from the crash dump data store 114, and match the function signature 110 with function signatures from a plurality of crash dumps 116. The plurality of crash dumps 116 may be represented by data structures such as the one described below in FIG. 2. The function matching module 112 may employ the fuzzy string matching techniques described herein to generate a list of candidate duplicate function signatures 118 that have matching scores above a certain threshold. The candidate duplicate function signatures 118 can be further refined and matched against the function signature 110, call stack 108, and/or the crash dump 106 of the failure of the current application 104. The refined list can then be presented to a user in an interface.

The methods and systems described herein may be implemented using a general purpose computer system and/or a network computer environment. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 100 represents an abstraction of the functions that may be implemented using these types of hardware. After reading this disclosure, one having skill in the art could use these well-known circuit elements to construct the device shown in FIG. 1 to implement these methods and systems.

In some embodiments, the various modules and systems in FIG. 1 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 2:
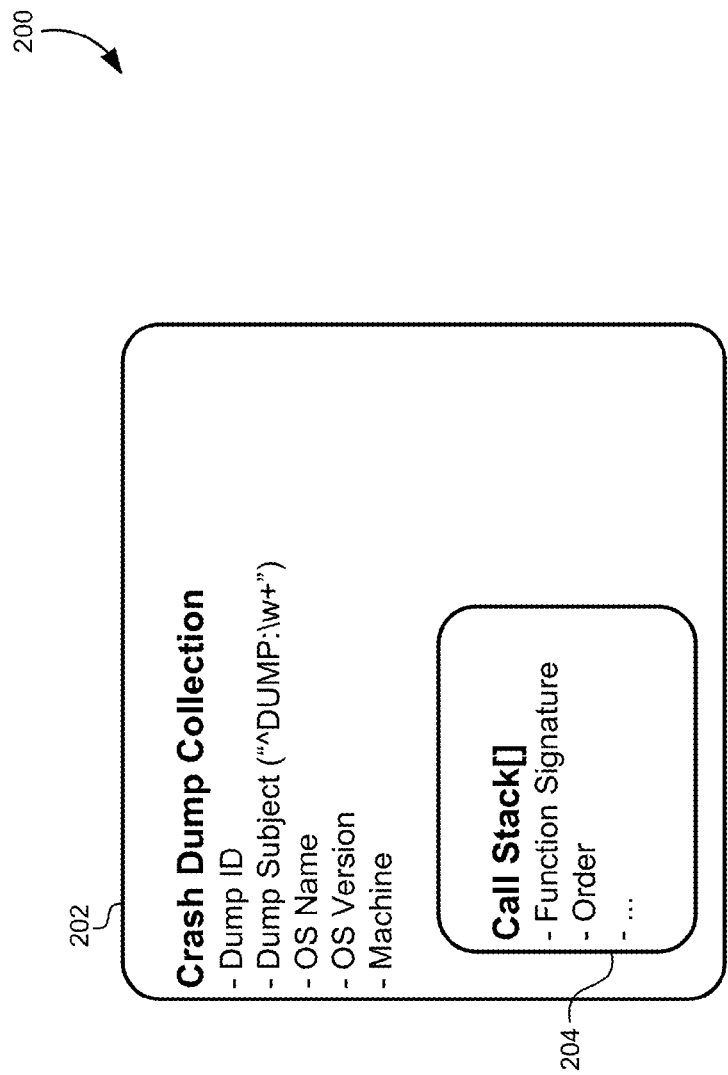
FIG. 2 illustrates a block diagram of a data structure for representing crash dumps, according to one embodiment.

FIG. 2 illustrates a block diagram 200 of a data structure 202 for representing crash dumps, according to one embodiment. The data structure 202 may extract information from the raw crash dump and organize it in such a way that the function matching module can easily digest information quickly and find function signatures to compare to the perpetrator function signature. The data structure 202 may include crash dump information, such as a dump ID, a dump subject, an operating system name, an operating system version, a computing environment, a particular machine on which the crash dump occurred, and/or the like. The data structure 202 may also include a call stack 204. Among other things, the call stack 204 may include a listing of function signatures in the call stack 204. Some embodiments may sanitize the call stack 204 by removing all information except the function signatures. This may be done when the data structure 202 is stored in the crash dump data store or when the data structure 202 is received by the function matching module.

Figure 3:
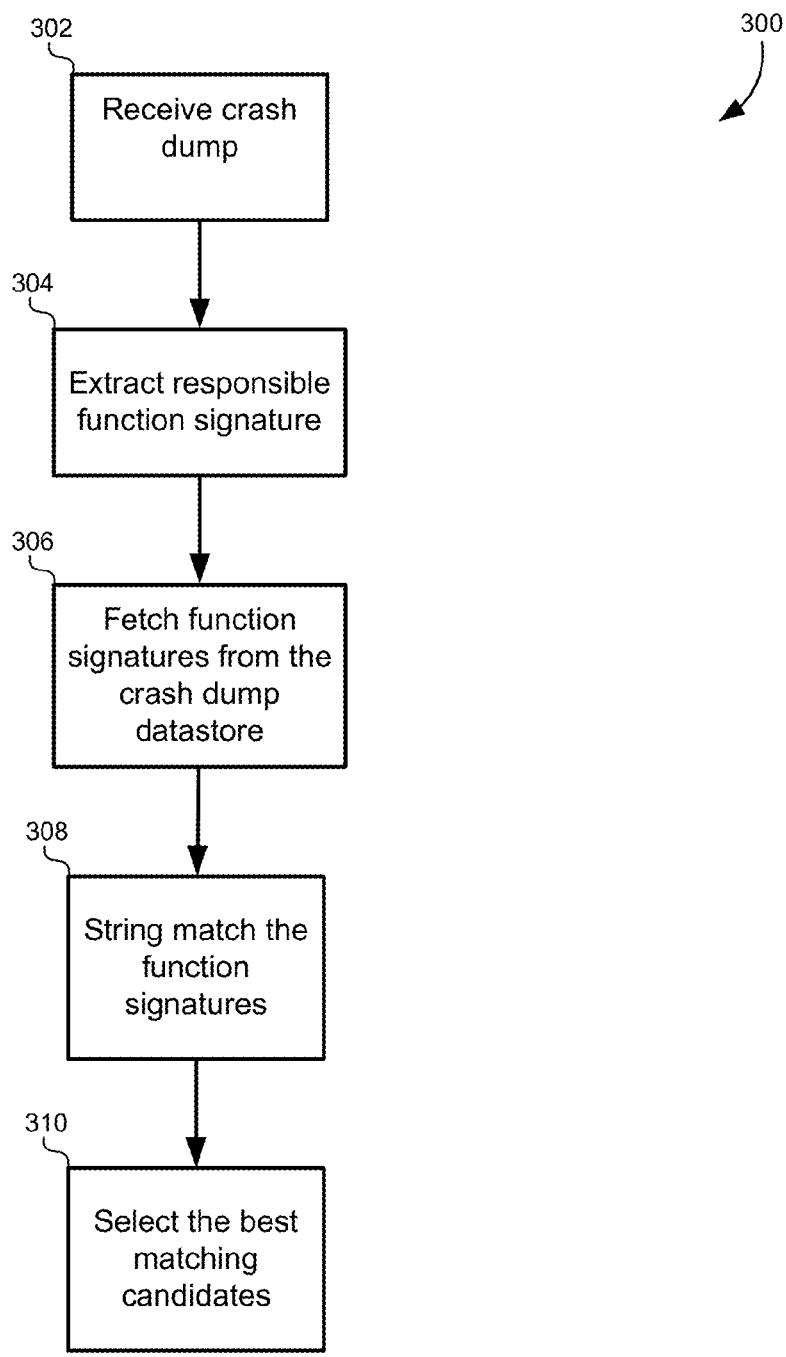
FIG. 3 illustrates a flowchart of a method for identifying duplicate crash dumps, according to one embodiment.

FIG. 3 illustrates a flowchart 300 of a method for identifying duplicate crash dumps, according to one embodiment. This method may be executed by the function matching module, and may include receiving a crash dump (302) and extracting a function signature from the crash dump that is believed to be responsible for the application failure (304). In some embodiments, the function matching module may simply receive the responsible function signature, while other embodiments may receive the entire crash dump and/or the call stack from the crash dump. The method may also include retrieving at least function signatures from the crash dump data store (306). As described above, a plurality of crash dump data structures can be retrieved from the crash dump data store, and function signatures can be extracted from these data structures for comparison. The function matching module can then compare each of the function signatures from the crash dump data store with the function signature causing the current failure (308). The function signatures that most closely match the current function signature can be selected as the best matching candidates (310). These candidates can then be further refined to identify duplicate crash dumps and/or presented to a user in an interface of the computer system.

It should be appreciated that the specific steps illustrated in FIG. 3 provide particular methods of identifying duplicate crash dumps according to various embodiments of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
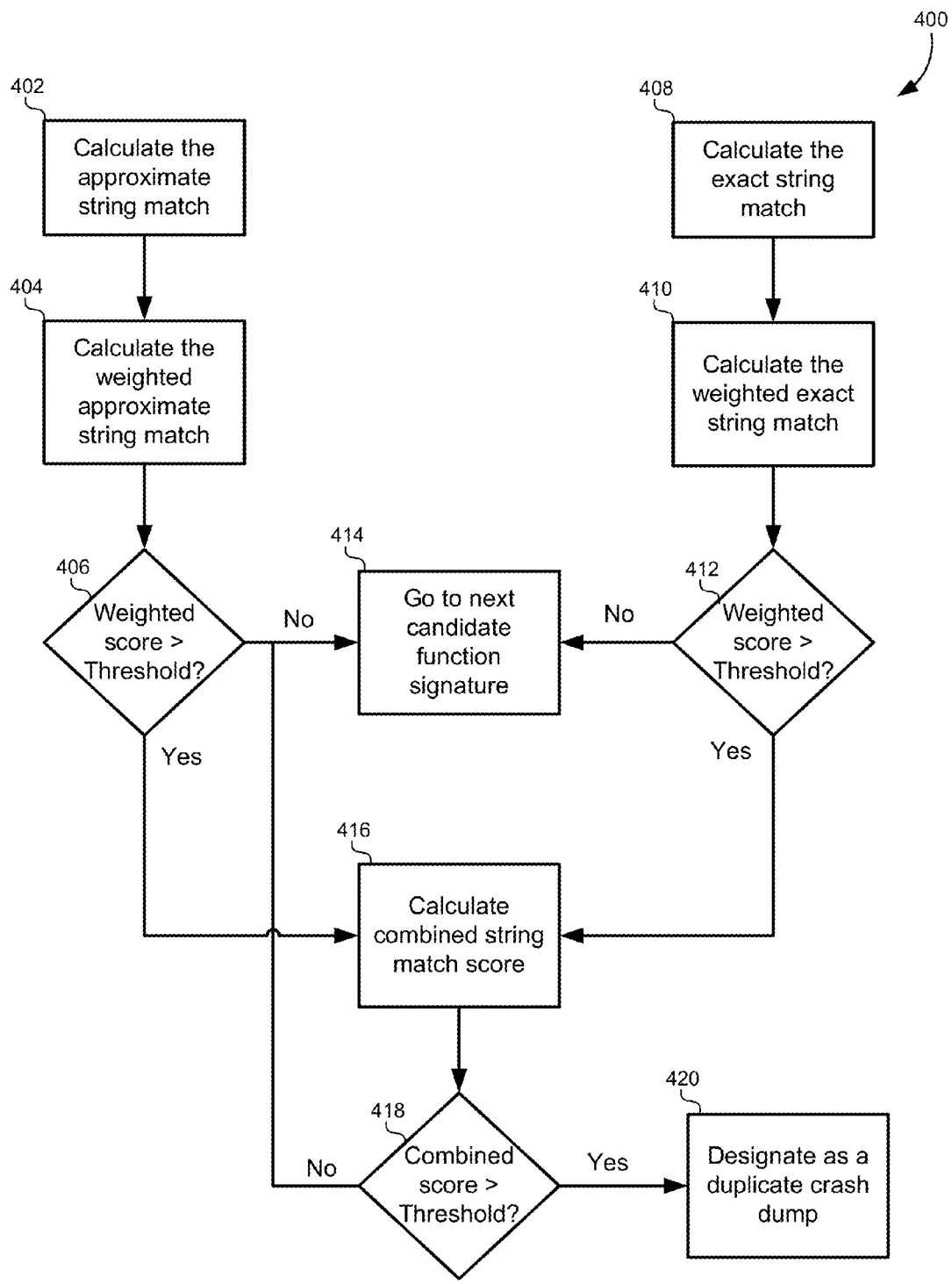
FIG. 4 illustrates a flowchart of a method for matching function signatures using a multidimensional spatial search, according to one embodiment.

FIG. 4 illustrates a flowchart 400 of a method for matching function signatures using a multidimensional spatial search, according to one embodiment. As described above, some embodiments provide a matching algorithm to allow fuzzy searching of text blocks and provide a closest matching candidate from a pool of text blocks. This allows for a multidimensional spatial text search even though there may be mismatches because of differences between the text blocks. In designing these embodiments, it was discovered that using approximate string matching techniques generally produced results that were to inaccurate, i.e. the number of function signatures that were close to the current function signature was very large. At the same time, it was discovered that using exact string matching techniques also failed to generate acceptable results. To overcome the shortcomings, the present embodiments combine approximate string matching with exact string matching to leverage the advantages of both techniques and narrow the results down to a very accurate set of candidate function signatures.

The method may be carried out for each candidate string representing a function signature in the call stack of a prior crash dump. Each candidate string can be compared to a string representing the current function signature. The method may include calculating the approximate string match (402) and the exact string match (408) between the candidate function signature and the current function signature. In many cases, simply combining the approximate and exact string matching results arithmetically may not produce the best results. Therefore, some embodiments may weight these two string matching results before combining. The method may also include calculating a weighted approximate string match result (404) as well as calculating a weighted exact string match result (410). These results may be compared to individual threshold values (406, 412) to determine whether each of the results individually meet a predetermined criteria. If either weighted score does not meet the threshold, then the method can continue onto the next candidate function signature (414). If both of the weighted results pass their individual threshold, then they can be combined to calculate a combined string match score (416). This combined score can then be compared to a threshold to determine whether the combined score indicates a sufficiently similar match (418). If the combined score does not exceed the threshold, then the method can continue on to the next candidate function signature (414).

The threshold may be expressed in a number of different ways. In some embodiments, the threshold may represent a raw score, where the matching score has to meet or exceed the raw score. In other embodiments, the threshold may represent a minimum or maximum number of matches. For example, the threshold may represent the top five matching function signatures by score. In other embodiments, combinations of these types of threshold may be used. For example, the threshold may represent the top X number of function signatures that match within 5% of the current function signature.

The weight for each score can be a ratio the determines how much each score contributes to the overall combined score. By way of example, some embodiments can multiply one of the two scores by a weight (W), and can multiply the other score by (1-W).

It should be appreciated that the specific steps illustrated in FIG. 4 provide particular methods of matching function signatures according to various embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
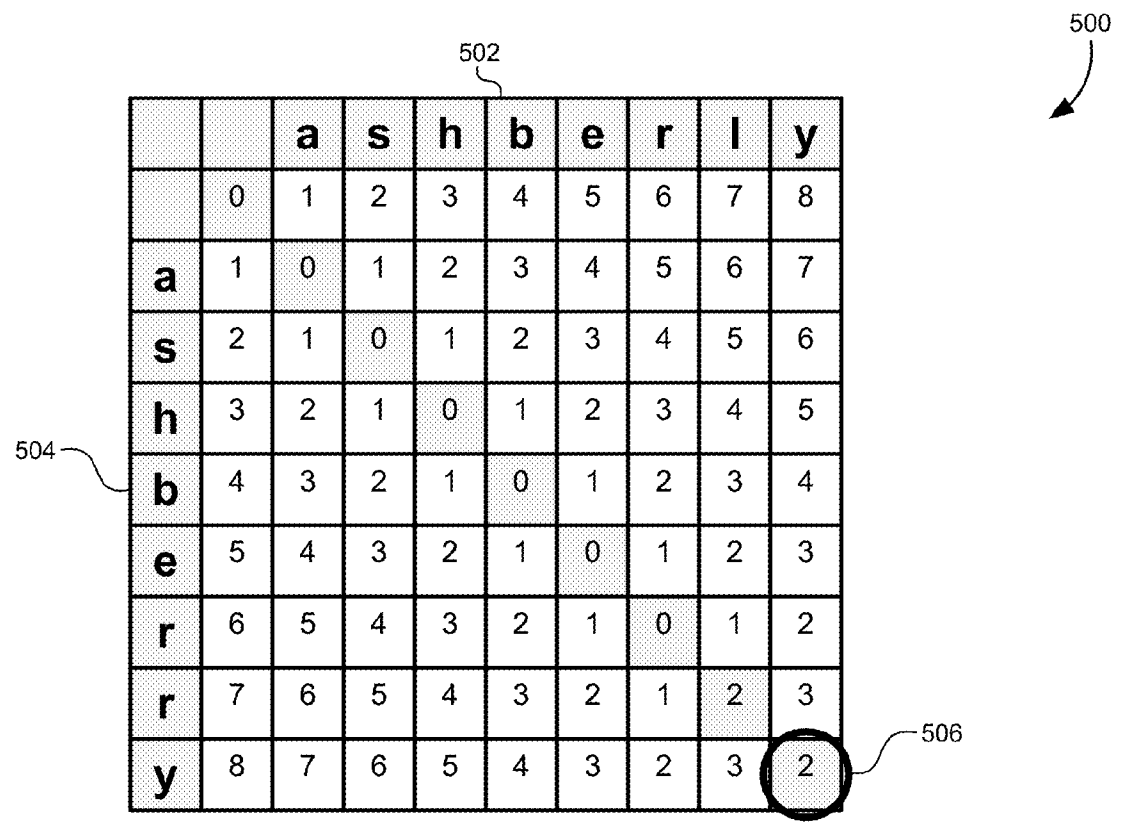

FIG. 5 illustrates a matrix 500 populated to determine an approximate string match, according to one embodiment. Approximate string matching algorithms may calculate a string metric, or matching score, that represents how closely one string matches another. By way of example, the Levenshtein distance may be used as an approximate string matching algorithm. The Levenshtein distance is a string metric for measuring the minimum number of single-character edits required to change one textblock into the other textblock. In some embodiments, the Levenshtein distance may be calculated recursively using the following equation.

$$lev_{a,b}(i, j) = \begin{cases} \max(i, j) & \text{if } \min(i, j) = 0 \\ \min \begin{cases} lev_{a,b}(i-1, j) + 1 \\ lev_{a,b}(i, j-1) + 1 \\ lev_{a,b}(i-1, j-1) + 1_{a_i \neq b_j} \end{cases} & \text{otherwise.} \end{cases} \quad (1)$$

In other embodiments, the Levenshtein distance may be calculated using dynamic programming techniques to speed up the calculations. For example, a Levenshtein distance matrix 500 can be populated to match a first string 502 to a second string 504. The Levenshtein distance 506 may be calculated as the last entry in the Levenshtein distance matrix 500. The final score for the approximate string matching technique can be dependent on the problem domain, e.g. the length of strings being compared. When using the Levenshtein distance, a Levenshtein score can be computed using the following equation, which in yields a score of 0.75 for the example in FIG. 5.

$$\text{Match Ratio} = 1 - \frac{\text{Levenshtein distance}}{\text{String Length}} = 1 - \frac{2}{8} = 0.75 \quad (2)$$

Figure 6:
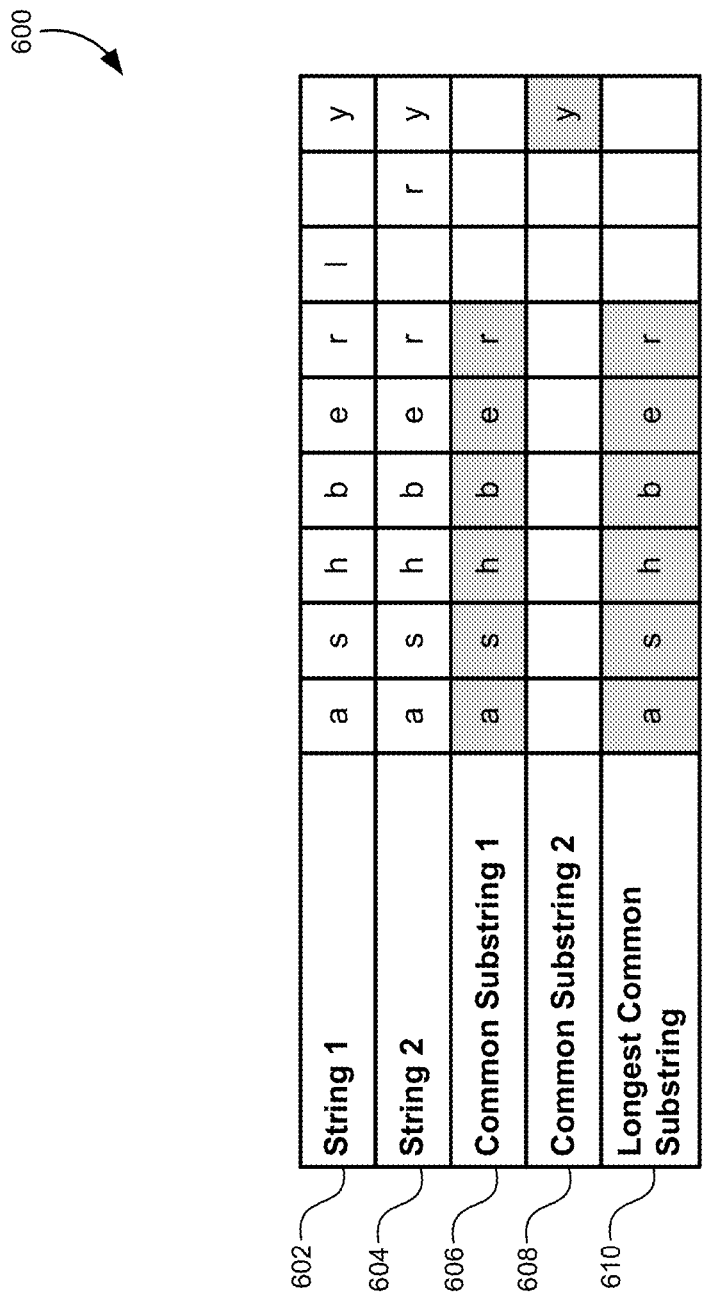
FIG. 6 illustrates a table of the results of an exact string match, according to one embodiment.

FIG. 6 illustrates a table 600 of the results of an exact string match, according to one embodiment. As described above, many exact string matching techniques may be used. By way of example, a Longest Common Substring algorithm can be used to find the longest common substring between two text strings. For example, a first string 602 and the second string 604 can be compared to identify a first common substring 606 and a second common substring 608. The longest common substring 610 in this case is the first common substring 606. As was the case of the approximate string matching technique, the exact string matching technique can also calculate a score based on the match. For example, the Longest Common Substring score can be calculated by the following equation, which yields a score of 0.75 in the example of FIG. 6.

$$LCS_{score} = \frac{2 \times \text{Len}(LCS)}{\text{Len}(String1) + \text{Len}(String2)} = \frac{2 \times 6}{8 + 8} = 0.75 \quad (3)$$

Figure 7:
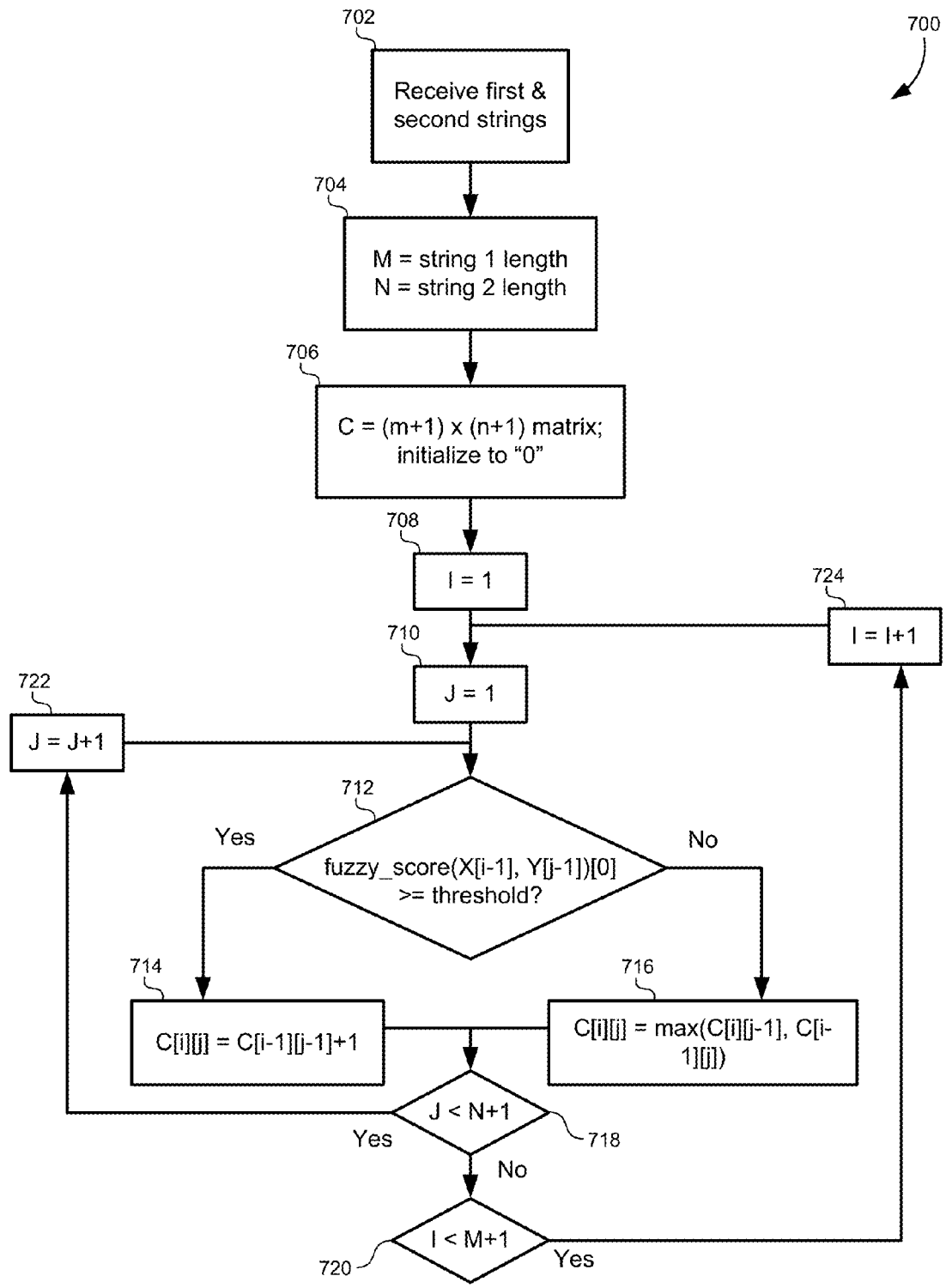
FIG. 7 illustrates a flowchart of a method for calculating an approximate string match score, according to one embodiment.

FIG. 7 illustrates a flowchart 700 of a method for determining a fuzzy string match, according to some embodiments. Search strings can be received (702), and variables can be initialized according to the string lengths (704). A Levenshtein distance matrix (C) can be initialized (706) along with matrix index counters (708, 710). Various embodiments may implement this algorithm with a recursive formula or to using a dynamic programming matrix. When using dynamic programming, a 2-D matrix can be constructed as previously described herein that is based on the length of the two strings to be matched. The algorithm first sols for smaller overlapping sequences, and subsequently increases the searching sub-space until it is solving the entire sequence problem. The algorithm then backtracks out of the matrix until the actual subsequence has been determined.

FIG. 8 illustrates pseudocode 800 in the Python programming language for implementing a similar algorithm, according to some embodiments. The pseudocode 800 follows the flowchart 700 of FIG. 7, and is included herein by way of example in order to provide an enabling disclosure.

In order to match one group of text strings to another group of text strings, matching scores can be calculated on each individual text string pair within the groups, and a final matching score can be calculated for the group. For example, table 1 below illustrates to different text blocks, each including 10 similar text strings.

TABLE 1

| TEXT BLOCK 1 | TEXT BLOCK 2 |
| --- | --- |
| derrises | derremes |
| shberry | ashberly |
| officio | officio |
| cooboo | cooboo |
| pituicyte | pituccyle |
| behooveful | behoooeful |
| mithraeums | mithraenms |
| isocholanic | istchoaabic |
| hemianoptic | heozhnoppic |
| shortener | spureener |

Table 2 below illustrates how each of the lines can be matched using a fuzzy score, and how each of the lines can then be compared using the Longest Common Subsequence. Any mismatch score over a certain threshold is considered to be a complete mismatch.

TABLE 2

| TEXT BLOCK 1 | TEXT BLOCK 2 | Match Score | Differences | String Length |
|---|---|---|---|---|
| derrises | | 0 | 9 | 9 |
| | derremes | 0 | 8 | 8 |
| ashberry | ashberly | 0.88 | 2 | 16 |
| officio | officio | 1 | 0 | 14 |
| cooboo | cooboo | 1 | 0 | 12 |
| pituicyte | | 0 | 6 | 6 |
| | pituccyle | 0 | 9 | 9 |
| behooveful | behoooeful | 0.9 | 2 | 20 |
| mithraeums | mithraenms | 0.9 | 2 | 20 |
| isocholanic | | 0 | 10 | 10 |
| hemianoptic | | 0 | 10 | 10 |
| shortener | | 0 | 10 | 10 |
| | istchoaabic | 0 | 11 | 11 |
| | heozhnoppic | 0 | 11 | 11 |
| | spureener | 0 | 9 | 9 |
| Total | | | 99 | 175 |

A final score can then be calculated by considering the differences across all the lines. Based on this algorithm, a search can be performed on a pool of text blocks or candidates, and the candidate with the highest score can be reported as the closest match. The match score can be calculated by the following equation, which yields a score of 0.43 for the data in Table 2.

$$\text{Match Score} = 1 - \frac{\Sigma \text{Difference}}{\Sigma \text{String Length}} = 1 - \frac{99}{175} = 0.43 \quad (4)$$

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
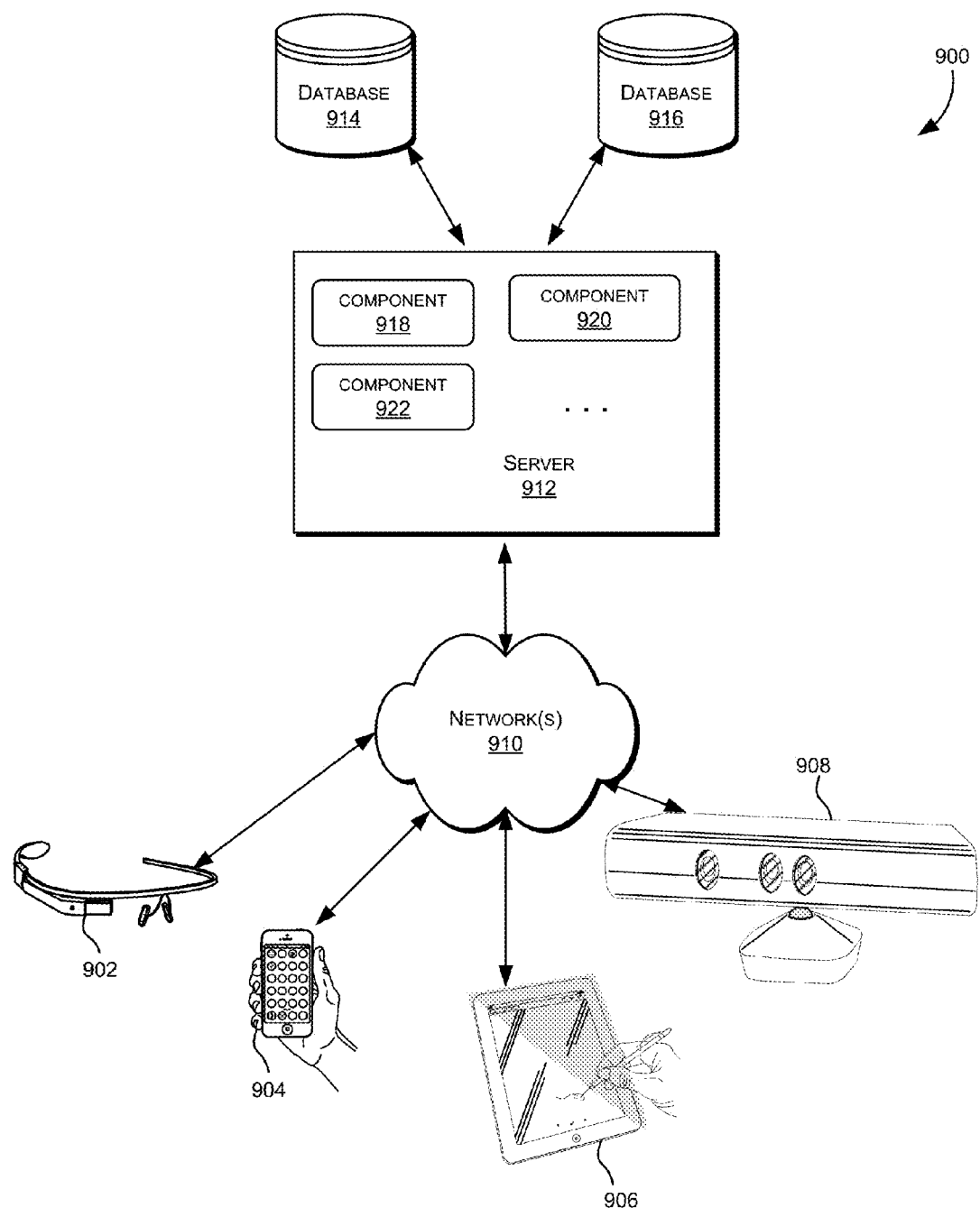
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
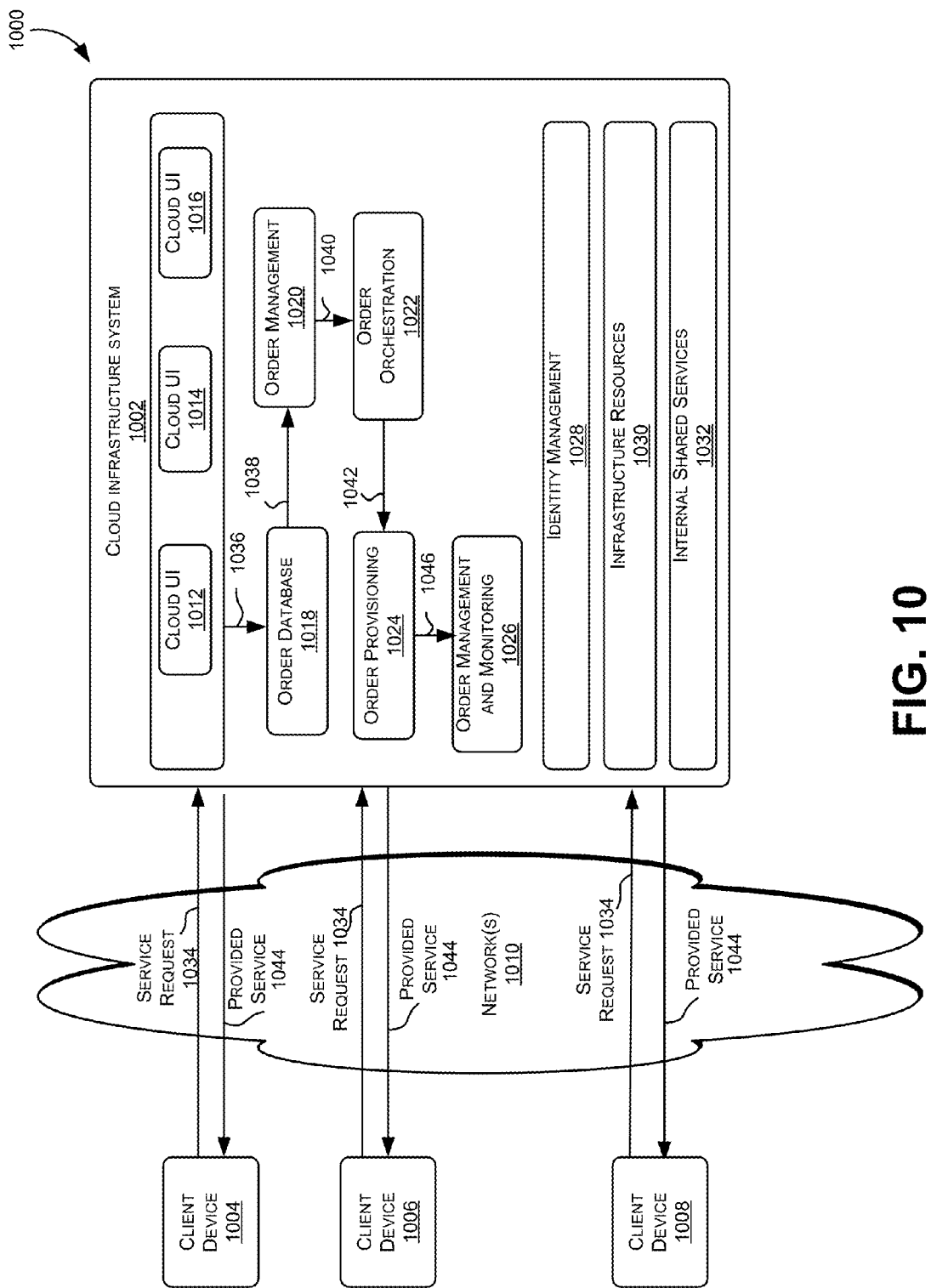
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of identifying substantially similar data fields, the method comprising:
   accessing a first text string;
   accessing a second text string;
   performing an approximate string-matching algorithm on the first text string and the second text string, wherein the approximate string-matching algorithm generates a first score;
   comparing the first score to a first threshold;
   performing an exact string-matching algorithm on the first text string and the second text string, wherein the exact string-matching algorithm generates a second score;
   comparing the second score to a second threshold;
   generating a third score by combining a weighted first score with a weighted second score;
   comparing the third score to a third threshold;
   determining whether the first text string is substantially similar to the second text string based on:
     the comparing of the first score to the first threshold;
     the comparing of the second score to the second threshold; and
     the comparing of the third score to the third threshold.

2. The method of claim 1, wherein the weighted first score comprises the first score multiplied by a weight (w), and the weighted second score comprises the second score multiplied by (1-w).

3. The method of claim 1, wherein performing the approximate string-matching algorithm comprises generating a Levenshtein distance matrix.

4. The method of claim 3, wherein rows in the Levenshtein distance matrix are populated based on characters in the first text string, and columns in the Levenshtein distance matrix are populated based on characters in the second text string.

5. The method of claim 1, wherein the first score is scaled by the length of the first text string or the second text string.

6. The method of claim 1, wherein the first score comprises a factor subtracted from 1, wherein the factor comprises a Levenshtein distance between the first text string and the second text string divided by the length of the first text string or the second text string.

7. The method of claim 1, wherein the third threshold is selected to match 5% of string comparisons to the first string.

8. A system comprising:
   one or more processors; and
   one or more memory devices comprising instructions that, when executed by the one or more processors, cause the one or more processors to perform operations comprising:
     accessing a first text string;
     accessing a second text string;
     performing an approximate string-matching algorithm on the first text string and the second text string, wherein the approximate string-matching algorithm generates a first score;
     comparing the first score to a first threshold;
     performing an exact string-matching algorithm on the first text string and the second text string, wherein the exact string-matching algorithm generates a second score;
     comparing the second score to a second threshold;
     generating a third score by combining a weighted first score with a weighted second score;
     comparing the third score to a third threshold;
     determining whether the first text string is substantially similar to the second text string based on:
       the comparing of the first score to the first threshold;
       the comparing of the second score to the second threshold; and
       the comparing of the third score to the third threshold.

9. The system of claim 8, wherein performing the exact string-matching algorithm comprises performing a Longest Common Substring (LCS) algorithm.

10. The system of claim 9, wherein the LCS algorithm is configured to identify one or more common substrings in the first text string and the second text string.

11. The system of claim 10, wherein the LCS algorithm is configured to select a longest of the one or more common substrings.

12. The system of claim 8, wherein the second score comprises twice the length of the largest common substring divided by the sum of a length of the first text string and a length of the second text string.

13. A non-transitory, computer-readable medium comprising instructions that, when executed by one or more processors, cause the one or more processors to perform operations comprising:
   accessing a first text string;
   accessing a second text string;
   performing an approximate string-matching algorithm on the first text string and the second text string, wherein the approximate string-matching algorithm generates a first score;
   comparing the first score to a first threshold;
   performing an exact string-matching algorithm on the first text string and the second text string, wherein the exact string-matching algorithm generates a second score;
   comparing the second score to a second threshold;
   generating a third score by combining a weighted first score with a weighted second score;
   comparing the third score to a third threshold;
   determining whether the first text string is substantially similar to the second text string based on:
      the comparing of the first score to the first threshold;
      the comparing of the second score to the second threshold; and
      the comparing of the third score to the third threshold.

14. The non-transitory, computer-readable medium claim 13, wherein:
   the first text string comprises a first function signature extracted from a crash dump, wherein a function associated with the first function signature caused a crash associated with the crash dump; and
   the second text string comprises a second function signature extracted from a data store comprising a plurality of function signatures from a plurality of crash dumps.

15. The non-transitory, computer-readable medium claim 14, comprising additional instructions that cause the one or more processors to perform additional operations comprising:
   extracting call stacks from the plurality of crash dumps;
   extracting the plurality of function signatures from the call stacks.

16. The non-transitory, computer-readable medium claim 14, wherein the plurality of crash dumps comprises a database that stores crash dump information from previous application crashes.

17. The non-transitory, computer-readable medium claim 14, wherein the first function signature comprises a top-most function signature in a call stack of the crash dump.

18. The non-transitory, computer-readable medium claim 14, wherein the first function signature comprises a unique function signature that was called when an application crashed.

19. The non-transitory, computer-readable medium claim 14, comprising additional instructions that cause the one or more processors to perform additional operations comprising:
   sanitizing a call stack in the crash dump by removing all non-application function calls.

20. The non-transitory, computer-readable medium claim 13, comprising additional instructions that cause the one or more processors to perform additional operations comprising:
   causing results to be displayed on the display device, wherein the results comprise a table including the first score, the second score, and the third score.

* * * * *

UNITED STATES PATENT AND TRADEMARK OFFICE
CERTIFICATE OF CORRECTION

PATENT NO. : 10,489,461 B2
APPLICATION NO. : 15/446670
DATED : November 26, 2019
INVENTOR(S) : Bhattacharjee et al.

It is certified that error appears in the above-identified patent and that said Letters Patent is hereby corrected as shown below:

In the Specification

In Column 2, Line 52, delete "matchuing" and insert -- matching --, therefor.

In Column 4, Line 16, delete "Wuncsh" and insert -- Wunsch --, therefor.

In Column 4, Line 16, delete "Taro-" and insert -- Jaro- --, therefor.

In Column 6, Line 21, delete "wsclen" and insert -- wcslen --, therefor.

In Column 6, Lines 32-33, delete "org_wc_sdup_16" and insert -- org_wcsdup_16 --, therefor.

In Column 6, Line 33, delete "may be" and insert -- may --, therefor.

In Column 9, Line 14, delete "the" and insert -- that --, therefor.

In the Claims

In Column 25, Line 32, in Claim 14, after "medium" insert -- of --.

In Column 26, Line 5, in Claim 15, after "medium" insert -- of --.

In Column 26, Line 13, in Claim 16, after "medium" insert -- of --.

In Column 26, Line 17, in Claim 17, after "medium" insert -- of --.

In Column 26, Line 20, in Claim 18, after "medium" insert -- of --.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*

In Column 26, Line 24, in Claim 19, after "medium" insert -- of --.

In Column 26, Line 30, in Claim 20, after "medium" insert -- of --.